United States Patent [19]

Shimizu et al.

[11] Patent Number: 5,545,341
[45] Date of Patent: Aug. 13, 1996

[54] PROCESS FOR PREPARING FERROMAGNETIC MATERIAL

[75] Inventors: Yo Shimizu; Masaru Miya; Akira Nagata, all of Ikeda, Japan

[73] Assignee: Agency of Industrial Science & Technology, Tokyo, Japan

[21] Appl. No.: 408,777

[22] Filed: Mar. 23, 1995

[30] Foreign Application Priority Data

Apr. 8, 1994 [JP] Japan .................................. 6-095764

[51] Int. Cl.$^6$ .............................. C09K 19/02; H01F 1/42
[52] U.S. Cl. .............................. 252/62.5 R; 252/299.61; 252/299.01
[58] Field of Search .................. 252/299.61, 299.01, 252/62.51 R

[56] References Cited

PUBLICATIONS

Lelièvre et al, "Diameric Substituted Copper Phthalocyanine Liquid Crystals. Synthesis, Characterization and Magnetic Properties", J.Am. Chem. Soc., 1992, pp. 4475–4479. no month.

*Primary Examiner*—Melissa Bonner
*Attorney, Agent, or Firm*—Nikaido, Marmelstein, Murray & Oram, LLP

[57] ABSTRACT

There is provided a process for preparing a ferromagnetic material, wherein at least 2 kinds of paramagnetic compounds preferably organic paramagnetic compounds, capable of manifesting a so-called mesophase between a solid phase, and a liquid phase are mixed with each other in a liquid phase or mesophase state. Preferred paramagnetic compounds are compounds containing a paramagnetic metal complex moiety in the molecular skeleton thereof, and a preferred complex moiety is a porphyrin complex. Preferred metal nuclei are Cu, V, Co, Mo, Ag, and Fe. The planes of the molecules of each of the paramagnetic metal porphyrin complexes in a mesophase thereof are oriented in parallel with each other on a time-average basis.

6 Claims, 7 Drawing Sheets

PROCESS FOR PREPARING FERROMAGNETIC MATERIAL

BACKGROUND OF THE INVENTION

The present invention relates to a process for preparing a novel ferromagnetic material.

Conventional ferromagnetic materials represented by ferrite are metallic materials. In this connection, however recent, research and development have activity been pursuing ferromagnetic materials made of an organic compound, an organometallic compound, an organometallic complex, or the like which will be referred to herein collectively as organic ferromagnetic materials.

In the development of such organic ferromagnetic materials, metal complexes having a radical(s) of an organic compound or a paramagnetic metal and/or atom in the molecule atom thereof have been a primary target of research.

Further, the development of such organic ferromagnetic materials has been based on a technology wherein an unpaired electron of a radical or a paramagnetic metal ion is controlled in a molecular arrangement based on the molecular structure thereof, or wherein a plurality of paramagnetic metal nuclei are arranged in one and the same molecule to develop a ferromagnetic interaction between spins. Specifically, in the development of organic ferromagnetic materials, a molecular structure-based methodology has been adopted, wherein the molecular structure is varied, or at least 2 radicals or paramagnetic metal nuclei are incorporated into one and the same molecule in such a manner as to generate ferromagnetism.

In these methods, however, a difficulty has been encountered in arbitrarily controlling such a molecular arrangement or structure, while a mixing proportion is restricted in order to obtain a desired molecular arrangement or structure. Accordingly, even if the molecular arrangement and structure is controlled, an optimum molecular arrangement, from the perspective of ferromagnetic interaction, cannot necessarily be materialized.

A primary object of the present invention is to provide a process for preparing a novel ferromagnetic material.

SUMMARY OF THE INVENTION

In view of the foregoing problems in the prior art, the inventors of the present invention have made intensive investigations to find out that, when at least 2 kinds of specific paramagnetic compounds are mixed with each other through utilization of the mutual miscibility thereof in a given state, the resulting mixture of the paramagnetic compounds manifests ferromagnetism. The present invention has been completed based on this finding.

More specifically, in accordance with the present invention, there is provided a process for preparing a ferromagnetic material, comprising mixing at least 2 kinds of paramagnetic compounds, capable of manifesting a mesophase, with each other in a liquid phase to produce a mesophase state thereof.

The present invention will now be described in detail.

The paramagnetic compounds that can be used so long the present invention are not particularly limited in as they can manifest a mesophase under conditions involving a given temperature and a given pressure. The term "mesophase" as used in the present invention is a concept covering a liquid crystal, a plastic crystal, etc., as well as mixed states thereof.

Preferred paramagnetic compounds are those including a paramagnetic metal complex in the molecular skeleton thereof, examples of which include those including in the molecule thereof a metal known as: a paramagnetic metal nucleus such as Cu (II), V (IV), Co (II), Mo (V), AG (II), or Fe (II) as a metal nucleus which coordinates with a diamagnetic ligand to form the skeleton of a metal complex, provided that the above-mentioned molecule usually has at least 4 long-chain alkyl moieties around the above-mentioned ligand in order to amplify manifestation of the mesophase.

In this case, the above-mentioned ligand is usually desired to provide a cylindrical, discotic, sphaerosymmetrical molecular shape as a whole. Specific examples of the ligand include porphyrin derivatives, benzylideneimine derivatives, phthalocyanine derivatives, bipyridyl derivatives, dithiolene derivatives, (di)phenyldiketonate derivatives, and glyoxime derivatives. One specifically preferred material for use in this invention is a paramagnetic porphyrin complex.

The mesophase that can be manifested by the aforementioned paramagnetic compounds may be of any type, examples of which include phases as can be seen in cylindrical liquid crystals including no common metal species, such as a nematic phase, a smectic phase, and a cholesteric phase; phases as can also be seen in common discotic liquid crystals, such as a discotic hexagonal phase, a discotic rectangular phase, and a discotic lamellar phase; and plastic crystal phases as mesophases.

Suitably usable examples of the paramagnetic compounds include 5,10,15,20-tetrakis(4-n-dodecylphenyl)porphinato copper (II), 5,10,15,20-tetrakis( 4-n-dodecylphenyl)porphinato oxo vanadium (IV), and homologous series of compounds thereto, etc.

In the present invention, the paramagnetic compounds are mixed with each other in a liquid under conditions sufficient to form a mesophase state thereof. The use of the paramagnetic compounds in such a state enables mixing thereof to be suitably effected through utilization of the mutual miscibility thereof.

The combination of the paramagnetic compounds to be mixed with each other may be appropriately determined depending on the kinds of paramagnetic compounds that are desired to be used, desired properties of the resulting material, etc. Further, the mixing proportion of the paramagnetic compounds may also be appropriately determined depending on the kinds and number of paramagnetic compounds to be used, desired properties of the resulting material, etc. For example, where 5,10,15,20-tetrakis(4-n-dodecylphenyl)porphinato copper (II) is mixed with 5,10,15,20-tetrakis(4-n-dodecylphenyl)porphinato oxo vanadium (IV), an especially high ferromagnetism is manifested at a mixing proportion of the former of about 40 to about 60% as shown in the following Example 1.

Further, if the molecular arrangement of the mixture in a mesophase state is optimum for the ferromagnetic function of the resulting material, one and the same state of molecular arrangement can be maintained substantially at any mixing proportions, whereby the ferromagnetic interaction between paramagnetic metal ions can be easily manifested.

There are many already-known liquid crystal compounds of metal complexes, which, however, include no examples wherein the above-mentioned metal complexes, when paramagnetic, serve to manifest ferromagnetism through utilization of the mutual miscibility thereof in a mesophase as in the present invention. On top of that, there, are no known examples wherein explication was made of the detailed mechanism of manifestation of ferromagnetism in a mixed system. Accordingly, it has never been known that utilization of a mixed system as in the present invention enables manifestation of ferromagnetism.

The process of the present invention is not aimed at preparing a ferromagnetic material with a single composition like conventional ones, and hence does not make use of conventional crystalline organic radicals or paramagnetic metal complexes not in the nature of exhibiting a liquid crystal phase or a mesophase.

Specifically, use is made of the miscibility of mesophase-exhibiting compounds both or all in a liquid crystal phase or mesophase state to effect mixing of at least 2 kinds of mesophase-exhibiting paramagnetic metal complexes at an appropriate mixing proportion to thereby accomplish a homogeneous molecular orientation or arrangement in the resulting mixed system, whereby ferromagnetism can be manifested. Accordingly, the molecular arrangement of the mixed system in a liquid phase (mesophase) state can be made optimum for the ferromagnetic interaction. In this case, the compounds, both in the liquid phase, can both maintain one and the same phase (in other words, the same state of molecular arrangement) at substantially any mixing proportions to easily produce a ferromagnetic interaction between paramagnetic metal ions contained therein.

As described hereinbefore, according to the process of the present invention, a ferromagnetic material can be comparatively easily obtained according to a methodology of mixing paramagnetic compounds utterly unlike the conventional methods.

DETAILED DESCRIPTION OF THE PREFERRED EMBODIMENTS

The following Examples will make the features of the present invention more clear.

EXAMPLE 1

5,10,15,20-tetrakis(4-n-dodecylphenyl)porphinato copper (II) and 5,10,15,20-tetrakis-(4-n-dodecylphenyl)porphinato oxo vanadium (IV), which are liquid crystals of paramagnetic metal complexes, both exhibit the same discotic lamellar (DL) phase, which is a liquid crystal phase. Hereinafter, the former is referred to briefly as $C_{12}$TPPCu and the latter is referred to briefly as $C_{12}$TPPVO. The phase transition temperatures of both are shown in Table 1.

TABLE 1

| Compound | Phase Transition Temperature (°C.) | | | |
|---|---|---|---|---|
| | Crystal | DL' Phase | DL Phase | Liquid |
| $C_{12}$TPPCu | | 27 | 45 | 183 |
| $C_{12}$TPPYVO | | 21 | 65 | 153 |

Figure 1:
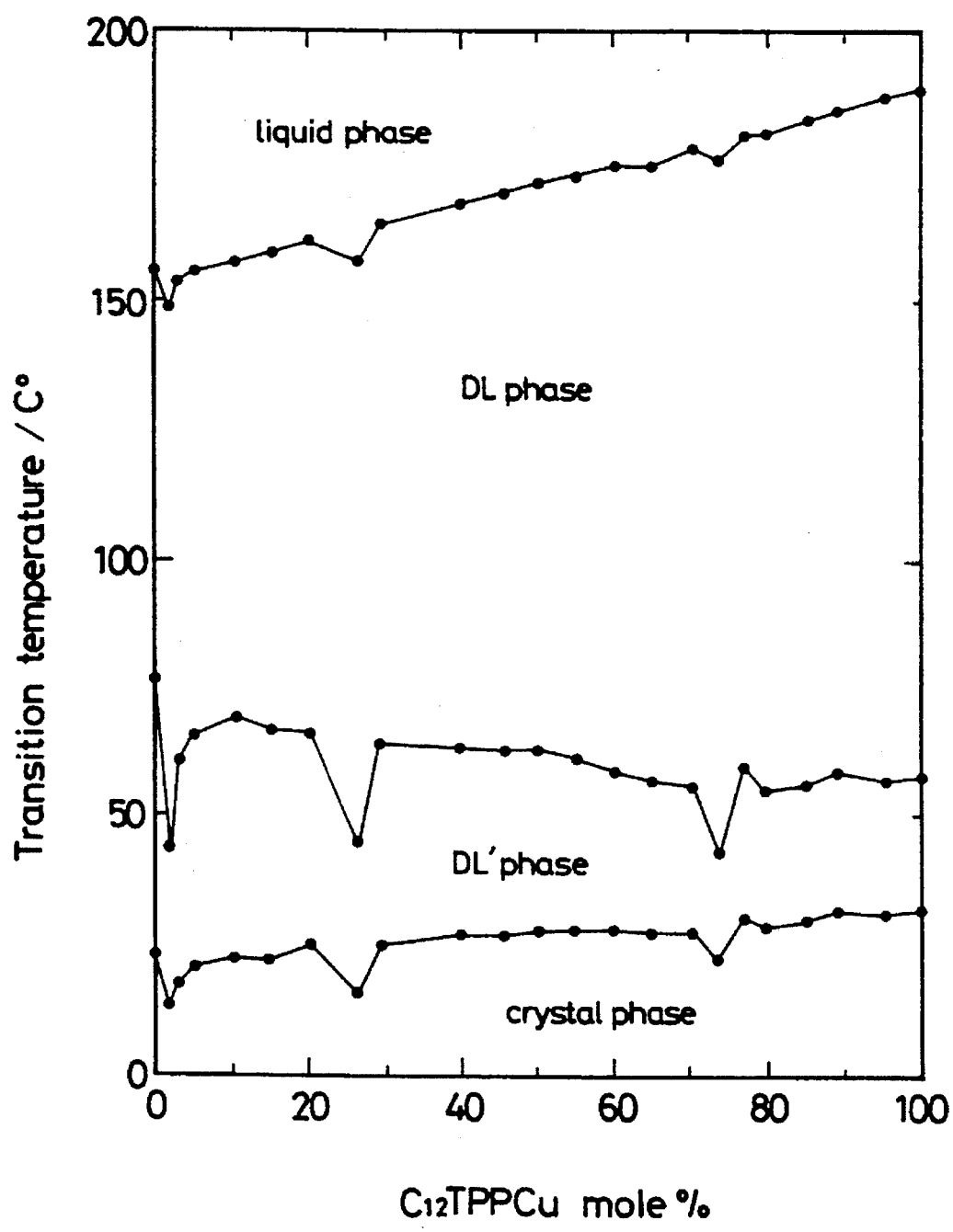
FIG. 1 is a phase diagram of a binary system composed of $C_{12}$TPPCu and $C_{12}$TPPVO in Example 1 according to the present invention.
Figure 2:
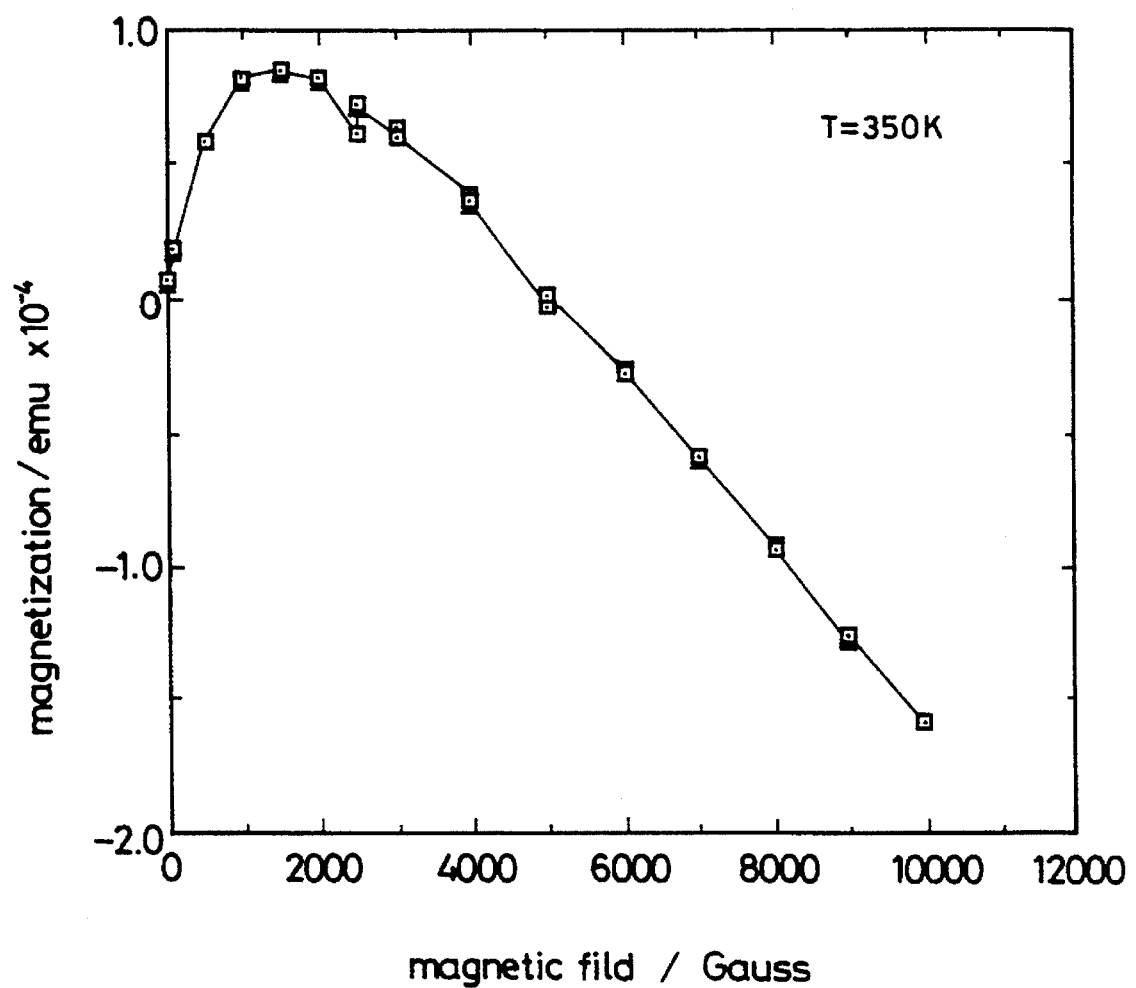
FIG. 2 is a diagram showing the dependence of the magnetization of a ferromagnetic material prepared in Example on the magnetic field applied thereto.
Figure 3:
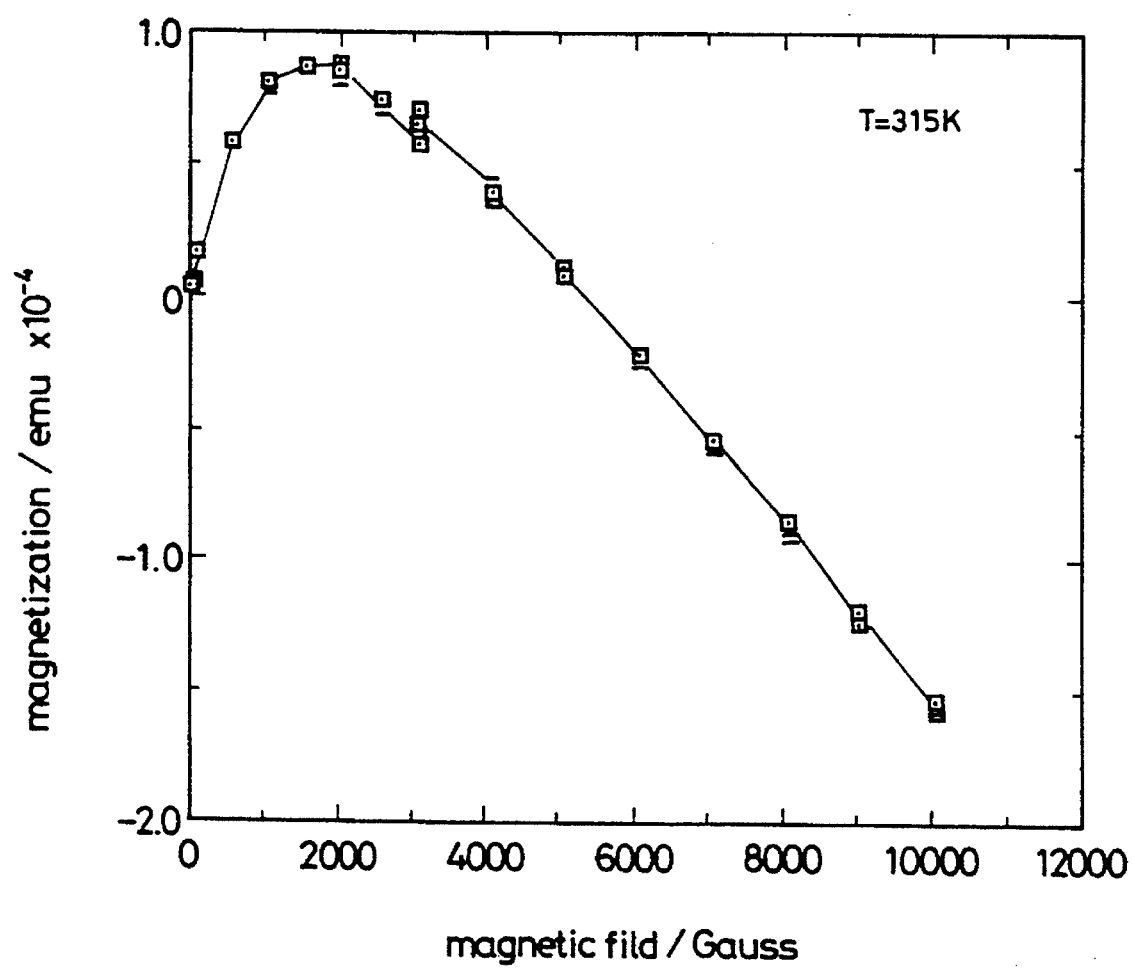
FIG. 3 is a diagram showing the dependence of the magnetization of a ferromagnetic material prepared in Example on the magnetic field applied thereto.
Figure 4:
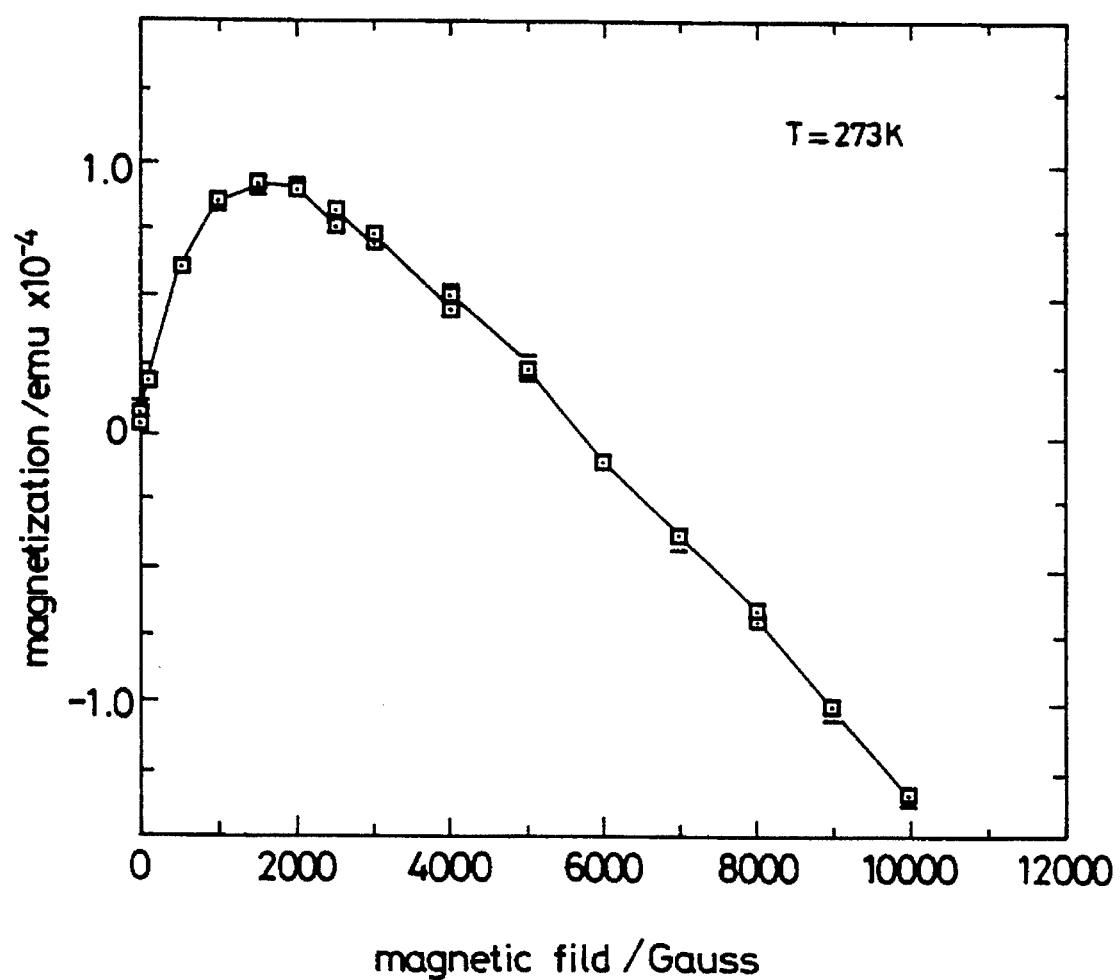
FIG. 4 is a diagram showing the dependence of the magnetization of a ferromagnetic material prepared in Example on the magnetic field applied thereto.
Figure 5:
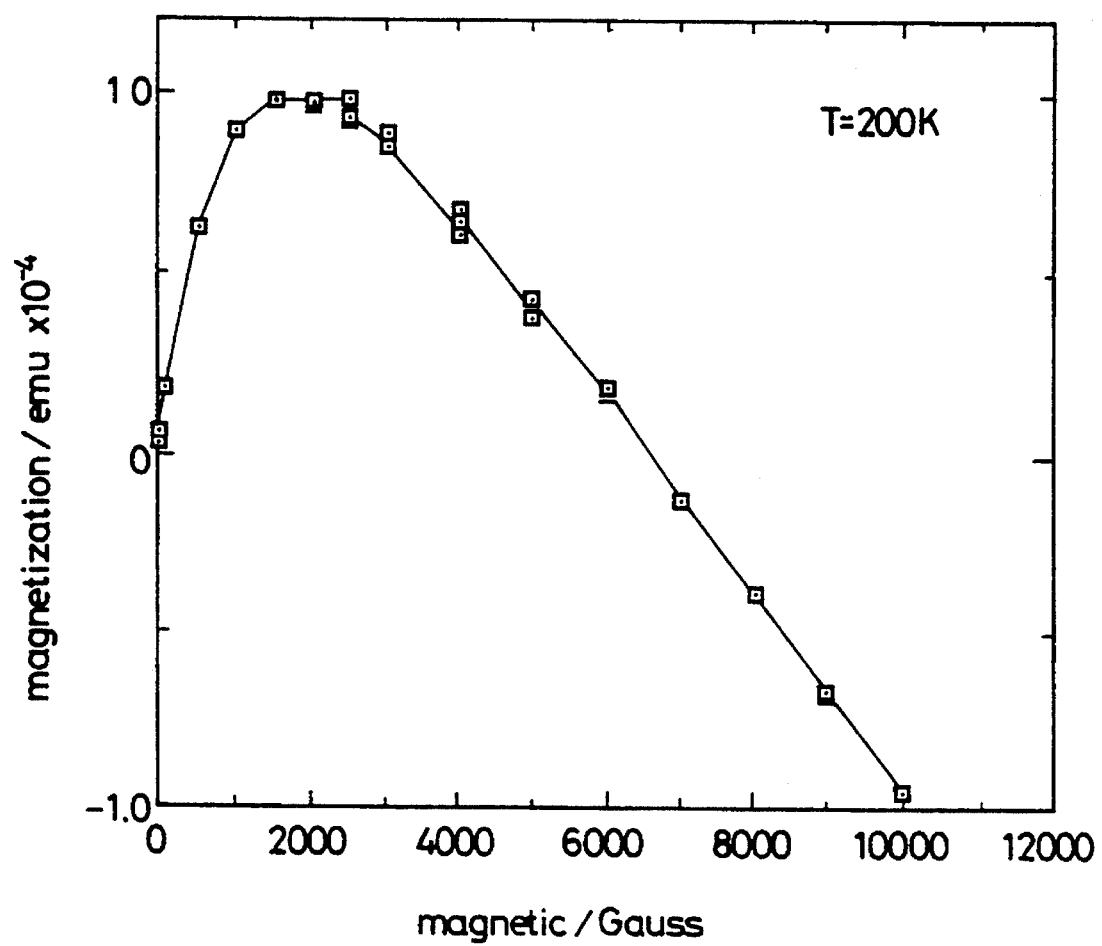
FIG. 5 is a diagram showing the dependence of the magnetization of a ferromagnetic material prepared in Example on the magnetic field applied thereto.

As is shown in FIG. 2, these liquid crystal paramagnetic metal complexes were miscible with each other in the whole range of mixing proportions (concentrations).

FIGS. 2 to 6 show the results of examination of the characteristics of the dependence of each phase on the magnetic field applied thereto for a mixed system having a $C_{12}$TPPCu:$C_{12}$TPPVO mixing ratio of 50:50, i.e., a mixing proportion of the copper complex of 50%. More specifically, FIG. 2 shows the results of measurement in the case of the DL phase, FIG. 3 in the case of the DL' phase, and FIGS. 4 to 6 in the case of the liquid crystal phase.

The results shown in FIGS. 2 to 5 demonstrate that ferromagnetism is exhibited in the temperature range of 200 to 350 K. Additionally stated, these figures all show a curve having a maximum value in the range of 1,000 to 2,000 gausses. This is attributed to the fact that each of the molecules of $C_{12}$TPPCu and $C_{12}$TPPVO is constituted of a moiety having paramagnetic properties (metal complex moiety) and a moiety having diamagnetic properties (substituent moiety).

Figure 6:
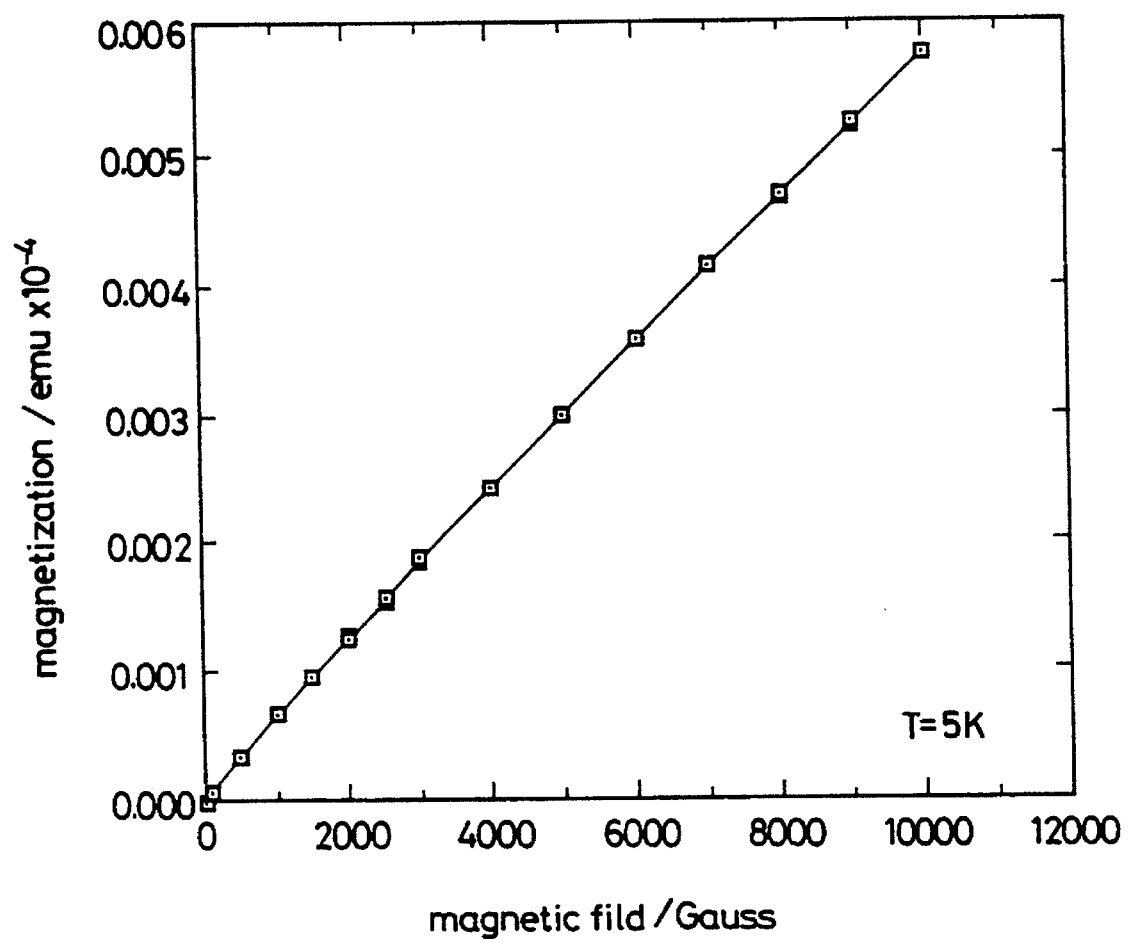
FIG. 6 is a diagram showing the dependence of the magnetization of a ferromagnetic material prepared in Example on the magnetic field applied thereto.

On the other hand, FIG. 6 shows the results of measurement of the paramagnetic molar magnetization of the above-mentioned mixed system at a temperature of 5K, demonstrating that the above-mentioned ferromagnetism is lost at extremely low temperatures.

Figure 7:
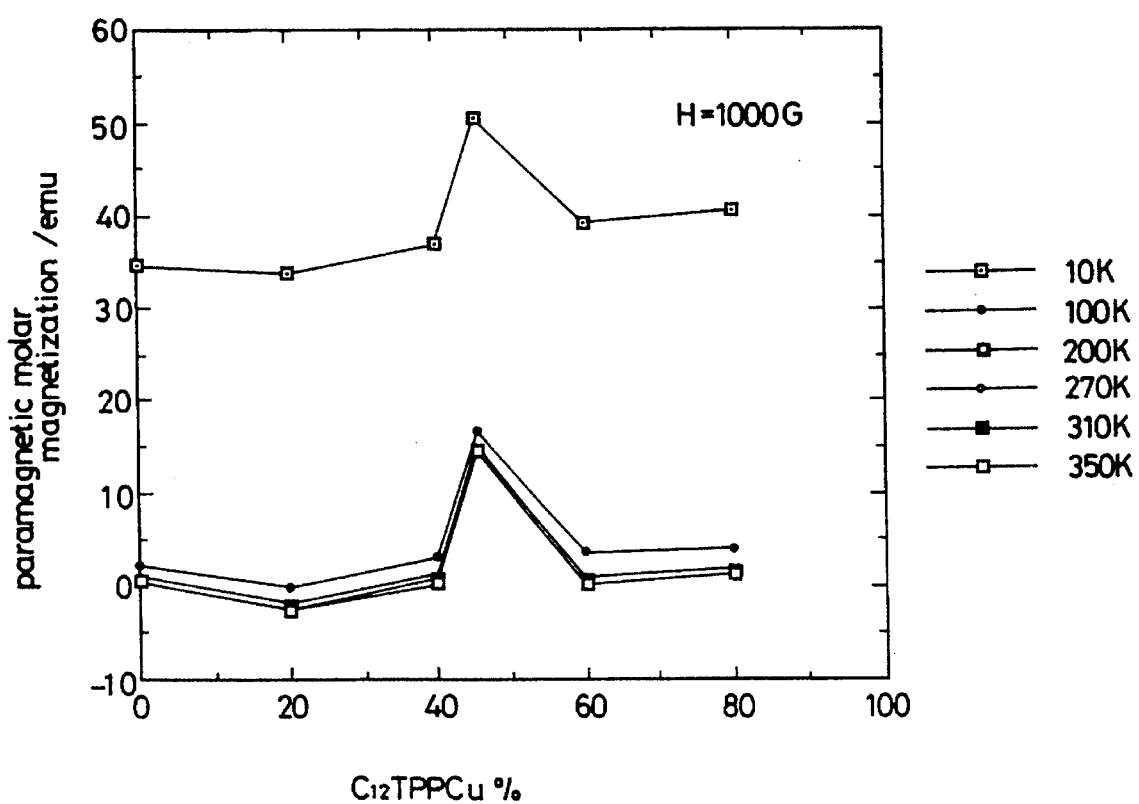
FIG. 7 is a diagram showing the dependence of the paramagnetic molar magnetization on the composition ratio in Example 1.

FIG. 7 shows the relationships between the paramagnetic molar magnetization and the mixing proportion which relationship were obtained by plotting with the temperature as a parameter. This figure demonstrates that the paramagnetic molar magnetization of the mixed system composed of $C_{12}$TPPCu and $C_{12}$TPPVO is prominently increased when the mixing proportion of the copper complex is in the range of 40 to 60%.

What is claimed is:

1. A process for preparing a ferromagnetic material, comprising mixing at least 2 kinds of organic paramagnetic compounds capable of organic manifesting a mesophase with each other in a liquid phase to mesophase state thereof.

2. A process as claimed in claim 1, wherein said paramagnetic compounds have a molecular skeleton having a paramagnetic metal complex moiety therein.

3. A process as claimed in claim 2, wherein said paramagnetic metal complex moiety comprise a paramagnetic metal porphyrin complex.

4. A process as claimed in claim 2 or 3, wherein Cu (II), V(IV), Co(II), Mo(V), Ag (II), or Fe (II), is contained as a metal nucleus in the molecule.

5. A process as claimed in claim 3, wherein said porphyrin metal complex molecules comprise, planes molecule which in a mesophase thereof, are oriented in parallel with each other on a time-average basis.

6. A process as claimed in claim 5 wherein said porphyrin metal complex is a discotic crystal.

* * * * *